(12) United States Patent
Yuan et al.

(10) Patent No.: US 8,386,370 B2
(45) Date of Patent: Feb. 26, 2013

(54) METHOD AND APPARATUS FOR PROVIDING A MARKET ENVIRONMENT

(75) Inventors: Walter M. Yuan, Arcadia, CA (US);
Rajeev Advani, New York, NY (US);
Peter L. Bossaerts, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 70 days.

(21) Appl. No.: 12/939,985

(22) Filed: Nov. 4, 2010

(65) Prior Publication Data
US 2011/0047047 A1 Feb. 24, 2011

Related U.S. Application Data

(63) Continuation of application No. 11/531,683, filed on Sep. 13, 2006, now Pat. No. 7,853,514.

(60) Provisional application No. 60/716,732, filed on Sep. 13, 2005.

(51) Int. Cl.
*G06Q 40/00* (2012.01)

(52) U.S. Cl. ............ 705/37; 705/27; 707/100; 709/223; 713/164

(58) Field of Classification Search .................. 703/223; 707/10, 100; 705/37, 35, 1, 36 R, 102, 27; 709/223; 713/164
See application file for complete search history.

(56) References Cited

U.S. PATENT DOCUMENTS

| | | | |
|---|---|---|---|
| 7,853,514 B1* | 12/2010 | Yuan et al. | 705/37 |
| 2003/0126245 A1* | 7/2003 | Feltin et al. | 709/223 |
| 2003/0204448 A1* | 10/2003 | Vishik et al. | 705/27 |
| 2004/0117390 A1* | 6/2004 | Karaoguz et al. | 707/100 |
| 2006/0123229 A1* | 6/2006 | Holloway et al. | 713/164 |

* cited by examiner

*Primary Examiner* — James Trammell
*Assistant Examiner* — Sanjeev Malhotra
(74) *Attorney, Agent, or Firm* — Lyon & Harr, LLP; Richard T. Lyon

(57) ABSTRACT

The system provides two-sided local markets that enable local and/or intermittent resource allocation through a market model. The system provides a method for defining goods, services or assets are to be exchanged among a large but limited number of participants (e.g. between 10 and 100). In one embodiment, all participants may have both needs and endowments of the goods, services and assets to be traded and who may at times want to simultaneously buy and sell multiple units. Alternatively the market may have participants who are either sellers or buyers. The system provides a market mechanism where participants can submit orders (through limit orders and market orders) in user defined time frames.

15 Claims, 6 Drawing Sheets

METHOD AND APPARATUS FOR PROVIDING A MARKET ENVIRONMENT

CROSS-REFERENCE TO RELATED APPLICATIONS

This application is a continuation of a prior application entitled "METHOD AND APPARATUS FOR PROVIDING A MARKET ENVIRONMENT" which was assigned Ser. No. 11/531,683 and filed Sep. 13, 2006. This continuation patent application also claims priority to U.S. Provisional Patent Application No. 60/716,732 filed Sep. 13, 2005 and incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A market is a system or process to enable buyers and sellers to initiate and settle transactions. One type of market is an exchange, which may be physical or virtual. An example of a physical exchange is the New York Stock Exchange (NYSE) and an example of a virtual exchange is NASDAQ. The NYSE is a physical exchange, where trading may be done face-to-face on a trading floor. Orders enter by way of brokerage firms that are members of the exchange and flow down to floor brokers who go to a specific spot on the floor where the stock trades. Prices are determined using an auction method where the current bid price is the highest amount any buyer is willing to pay and the current ask price is the lowest price at which someone is willing to sell. Once a trade has been made, the details are sent back to the brokerage firm, who then notifies the investor who placed the order. Although the NYSE is considered a physical exchange, in reality computers are used extensively to manage the transactions.

The NASDAQ is a virtual exchange where all of the trading computerized. The process is similar to the NYSE, in that the seller provides an asking price and the buyer provides a bidding price. However, buyers and sellers are electronically matched instead of physically.

Markets are not limited to the buying and selling of stock. Markets and exchanges exist for physical goods as well. A film festival is often in actuality a film market where distributors and investors attempt to purchase rights to exploit entertainment properties owned by film producers.

Such markets described above are also known as "two-sided" markets because they involve the matching up of many buyers and many sellers so that a market transaction can take place. Single sided markets typically have a single seller with multiple buyers. One example of a single sided market is an auction where one or more bidders seek to purchase a single item until it is sold. An example of a single sided market scheme is Ebay, where each transaction is an auction where many bidders (theoretically) attempt to have the highest bid at the end of some predetermined time period.

There are a number of advantages of having a defined market for enabling transactions in goods, services, or stocks. It has been found that markets are more efficient if information is made more widely available. Resources can be allocated to those most willing to pay for them. When a market exists, the price of an item is more likely to reflect the true current value of the item. Society has an interest in the efficient allocation of its resources. Economists have long believed that two-sided markets are often the most effective mechanism for efficient allocation of resources. Formalized two sided markets currently have been limited to large ongoing concerns such as stock exchanges. However, there are often local but intermittently occurring resource allocation problems that can't be effectively served by existing large markets. In addition it has proved inefficient to create special purpose markets or exchanges for such resource allocation problems. In practice, private social networks—through means such as meetings, phone calls, and emails—remain the dominant option for solving the problem of allocating intermittently occurring and/or local allocation problems. This mechanism has many well-known weaknesses, among which: lack of transparency; on-the-go rule setting; noncompetitive pricing and sub-optimal allocations; lack of incentives for truthful revelation of needs; and slowness with resulting high costs.

Two-sided electronic markets to date exist in only one format: large-scale, highly organized and regulated commodity and financial markets, such as the various futures and stock markets (e.g., NY Mercantile Exchange, NYSE, and NASDAQ). Smaller-scale, ad-hoc implementations hardly exist, and if they do, they lack agility (e.g., the Southern California Emissions Control Market controlled by the AQMD). Affiliates of a corporation, business to business (B2B), business to commerce (B2C), and commerce to commerce (C2C) environments, and ad-hoc groupings of non-commercial entities, could benefit from smaller, agile, often only temporary, intuitive, electronic two-sided markets.

SUMMARY

The system provides two-sided local markets that enable local and/or intermittent resource allocation through a market model. The system provides a method for defining goods, services or assets are to be exchanged among a large but limited number of participants (e.g. between 10 and 100). In one embodiment, all participants may have both needs and endowments of the goods, services and assets to be traded and who may at times want to simultaneously buy and sell multiple units. Alternatively the market may have participants who are either sellers or buyers. The system provides a market mechanism where participants can submit orders (through limit orders and market orders) in user defined time frames.

The system provides a resource for users to design, download and run their own local-markets instance with desired and custom characteristics. In one embodiment, each instance will have a number of benefits. The instance is light-weight, i.e. the entire downloadable marketplace may be packaged in a single binary archive. The system has been tested and optimized. The system is fast under heavy load conditions and is self contained, including an embedded data store (no external database dependency) to guarantee confidentiality. The system is customizable: in both presentation (i.e. tailor-made to the specific business domain) and market processing logic (i.e. rules and constraints). Finally, the system is deployment friendly and platform-independent.

DETAILED DESCRIPTION OF THE PREFERRED EMBODIMENTS

Figure 1:
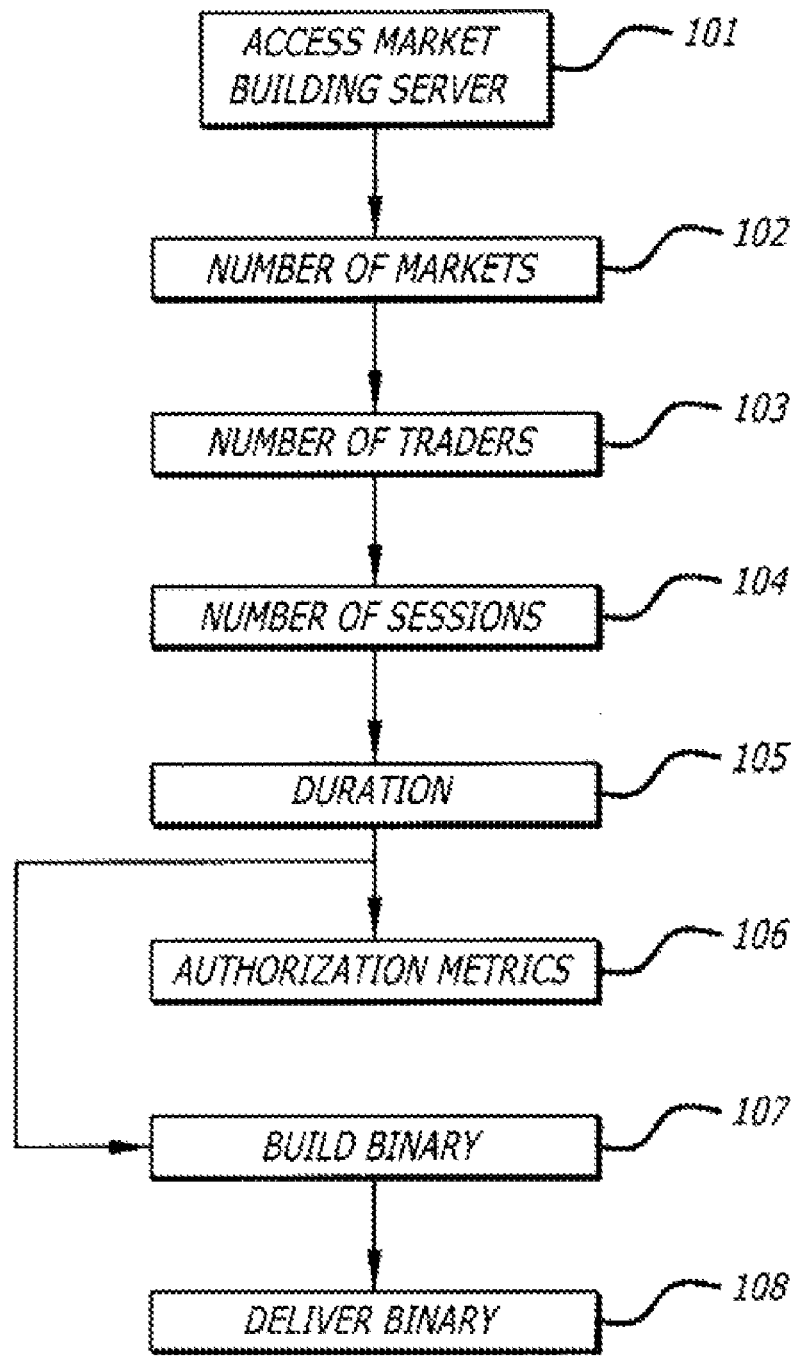
FIG. 1 is a flow diagram illustrating the creation of a market binary in one embodiment.

A system for providing a customizable market tool for use with local and/or intermittent markets is described. In the following description, numerous details are set forth in order to provide a more thorough understanding of the system. It should be understood that the system may be practiced without these specific details. In other instances, well known features have not been described so as not to obscure the system.

The system provides a method and apparatus for a user to design and download a customized market exchange platform where goods, services and assets can be bought and sold within self-determined confines. By way of example, consider the following.

A group of hospitals decides to arrange temporary exchanges, on an as-needed basis, of one of their scarcest resources, namely, skilled nurses. In the prior art, the administrators of the hospitals would agree to meet regularly to decide on the nurse exchanges for the coming period, as well as the corresponding compensation should swaps be deemed inequitable. E.g., hospital A agrees to provide 2 neonatal IC (intensive care) nurses for the coming week to hospital B in exchange for 3 geriatric floor nurses, and hospital B agrees to pay $2,000 to cover the presumed cost differential.

In a markets-based system, two-sided markets in nursing services are set up. Each market covers a different skill level (e.g., neonatal IC with at least 5 years experience and nationwide certification) for a pre-established time period (say, the second 12-hour shift of the coming Tuesday). Hospitals are allocated initial endowments that correspond to their nurse-service-units at hand (number of 12-hour shifts they can provide). Markets are opened for a pre-established time during which hospitals trade their nurse-service-units. To enhance efficiency, the hospitals are allowed to submit orders to both buy and sell, with only the final net position to be accounted for. Within certain limits, hospitals may even be given the right to short-sell nurse-service-units (establish negative positions), which they are expected to deliver upon (subject to hefty penalties for non-compliance) by drawing from a nursing pool outside their pre-established endowment.

It is important that hospitals can readily change the nature and scope of such nurse-service-units markets. That is, flexibility is crucial. Needs and availability change dramatically over time, not only because of natural attrition and hiring efforts at the supply side, but also because of seasonality and the like on the demand side. To avoid a looming flu epidemic, for instance, markets may be needed with the sole purpose of providing for flu shots. After natural or other disasters, markets in trauma nurse-service-units ought to be made online urgently.

The market infrastructure system enables this to be accomplished. The group of hospitals will be able to log onto a server and design the markets with a custom set of parameters. Subsequently, the server creates an executable markets instance—complete with back-office accounting in the form of an embedded and readily accessible database. The group downloads the instance onto their own servers and launches it for exclusive use by their member—with no other access required to the creating server, to assure privacy.

FIG. 1 illustrates a flow diagram illustrating operation of market instance creation in one embodiment of the system. At step 101 a user accesses the market creation server. At step 102 the number of markets is selected. In the system, each market represents an asset, good, or service to be traded. At step 103 the number of traders is defined. This determines the market participants. In the example above, each hospital at least would be a trader. At step 104 the number of sessions is defined. In one embodiment of the system, a session represents a time period where trading is allowed. If the custom market is for a local resource that has a known end date but has multiple instances, the number of sessions may match up with the number of days remaining till the end date. For example, a market could be created for buying, selling, or trading basketball tickets for a local team. The number of sessions might be chosen to be coextensive with the number of days in the season, so that the trade of tickets could occur each day of the season.

At step 105 the duration of each session is determined. The duration could be of any time length desired. In the hospital example noted above, the duration might be the normal working hours of the hospital administrators. At step 106 the authorization metrics are determined. This includes the user name and password of the person requesting the market instance. At step 107, the system builds a binary that includes all the parameters provided by the user and at step 108 the binary is delivered to the user.

In one embodiment of the system, the user pays a fee for the binary based on the parameters selected by the user. For instance, the price could increase based on number of markets, number of traders, number of sessions, and duration of the market.

Figure 5:
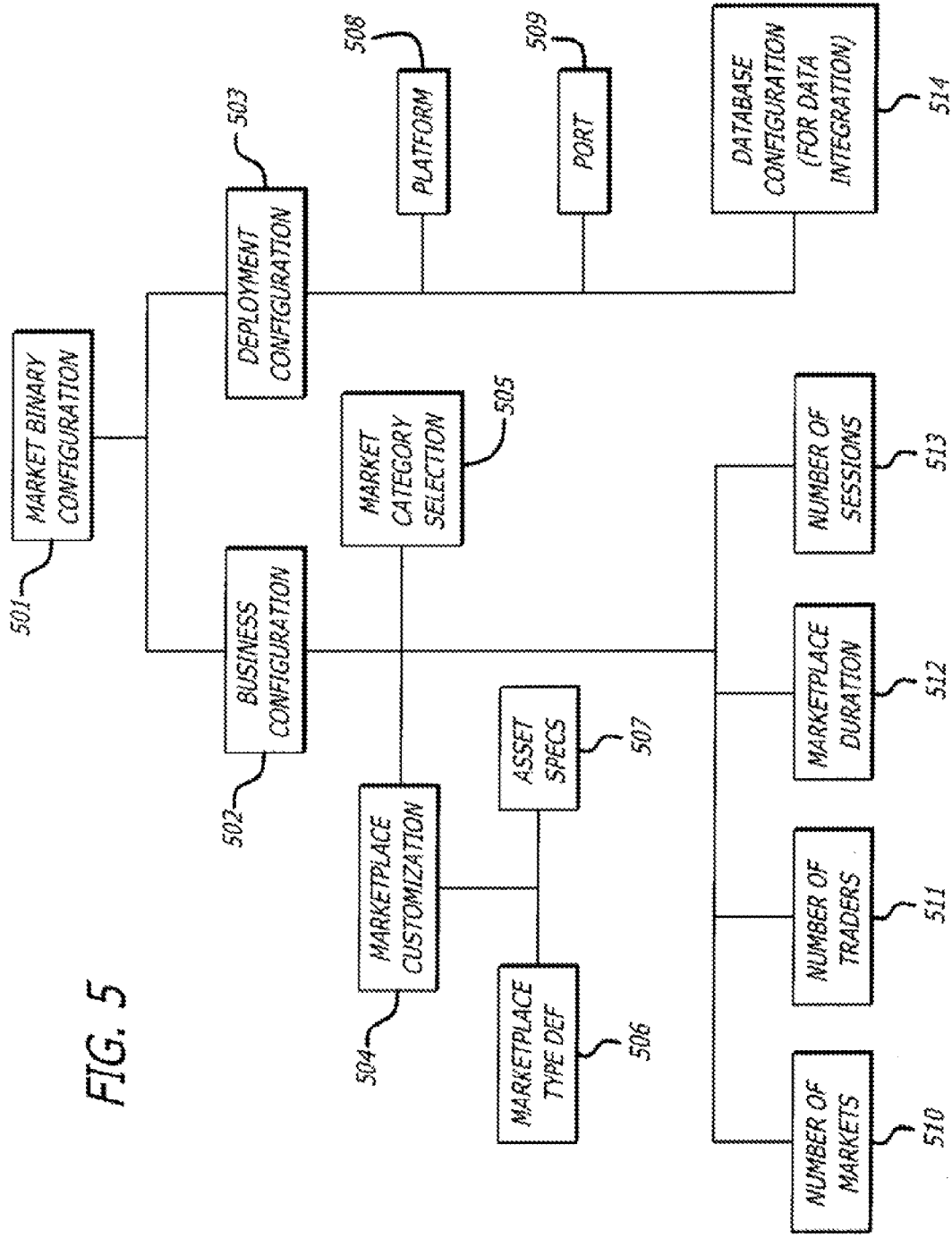
FIG. 5 illustrates another embodiment for the creation of a market binary.

FIG. 5 illustrates an alternate embodiment of binary creation. At step 501 the market binary configuration process begins. Step 502 is a branch to define the business configuration aspects of the binary and step 503 is a branch to define the deployment configuration of the binary. At step 505 the market category selection is made by the user. At step 504 a branch to define marketplace customization is made. At step 506 the marketplace "type" definition is made and the asset specifications are defined at step 507. At step 510 the number of markets is defined. At step 511 the number of traders is defined. At step 512 the marketplace duration is defined and at step 513 the number of sessions is defined.

At step 508 (part of the deployment configuration branch) the platform is determined (e.g. Windows, Macintosh, Linux, and the like). At step 509 the port that will be used is defined and at step 514 a database configuration is selected. As noted, the binary includes embedded database management.

Market Binary

Figure 2:
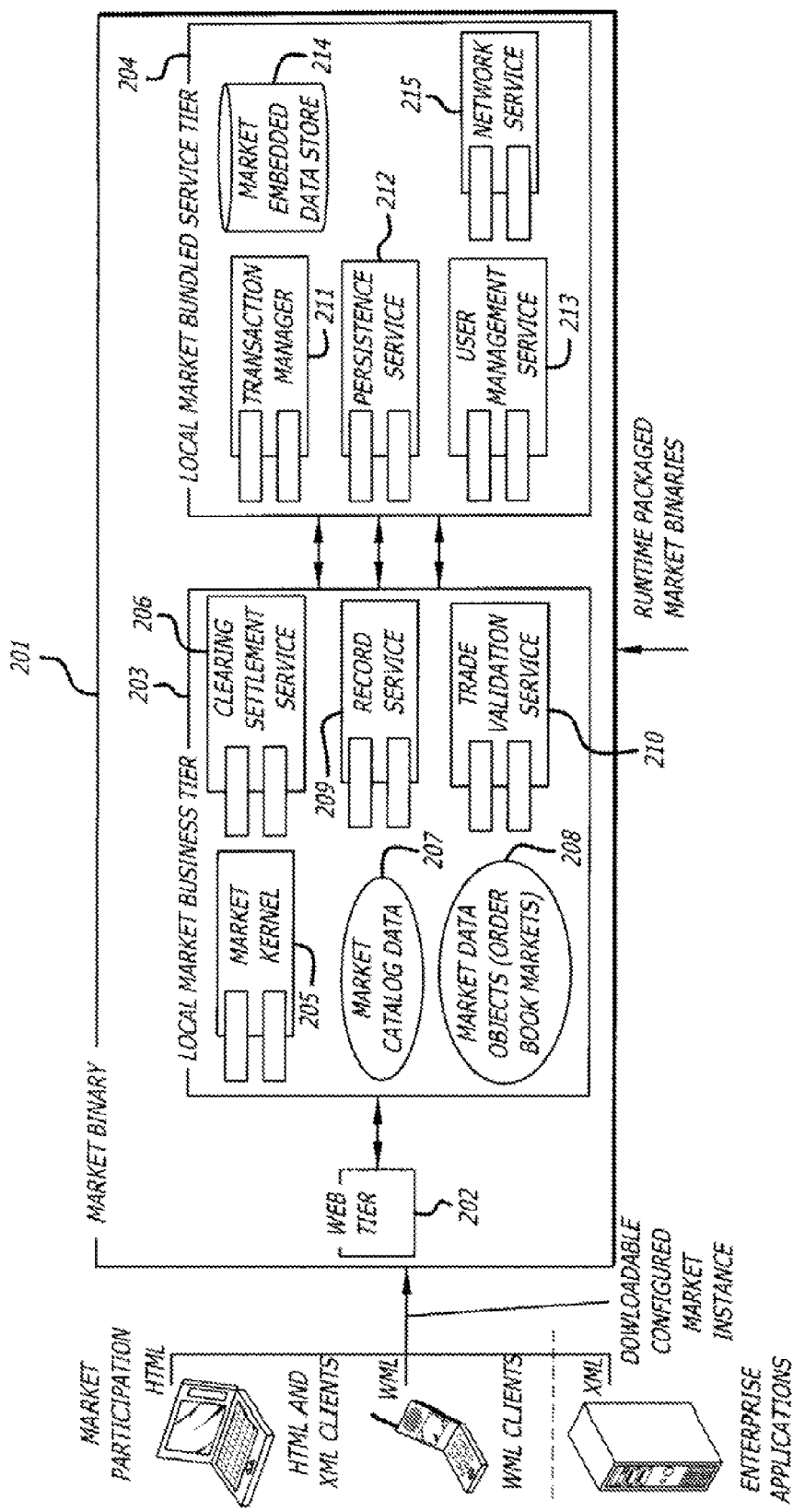
FIG. 2 illustrates the functional architecture of an embodiment of the market binary of the system.

The market binary of the system is configured as a set of functional tiers including a web tier, local market business tier, and local market bundled service tier. The market binary should execute a continuous, two-sided electronic market with real-time or near real-time responses to market update events. FIG. 2 illustrates the market binary of one, embodiment of the system coupled to a plurality of market participant devices. The market binary 201 includes a web tier 202, local market business tier 203, and local market bundled service tier 204. Market binary 201 is shown coupled to a number of clients including a computer, hand-held device and an enterprise appliance. In one embodiment the market binary is implemented as a browser based executable so that clients may be any device capable of running a browser.

The web tier 202 provides a web-based public interface for participants to interact with the market. Communications can occur through regular HTTP, encrypted HTTPS, or Simple Object Access Protocol "SOAP" (for web service) channels using any suitable data format. For example, the system may use HML, WML, and/or XML.

The local market business tier 203 provides a web-based public interface for participants to interact with the market. Communications can occur through regular HTTP, encrypted HTTPS, or SOAP (for web service) channels using data formats such as HTML, WML and XML. Tier 203 includes Market kernel 205 that implements the market mechanism and coordinates the actions among various components in the business tier. It receives order requests as input and matches trades and updates the market as output.

Report service 209 creates an easily analyzable and transformable (e.g. HTML, spreadsheet, PDF, XML with different DTD specifications) report of the market session with user credential as input and an XML based market report that contains a complete list of market configuration parameters and all orders submitted during the market session in chronological order as output.

Trade validation service 210 is responsible for validating incoming orders against market or trader rules and constraints, such as buy and sell eligibility rules, and bankruptcy and short-sell constraints. The input is an order request and the output is an order status update.

Clearing and settlement service 206 is an optional component that provides a data interface in case external clearing and settlement agents are required for guaranteeing the integrity of the market. It outputs trade data records on a per trader basis.

Market catalog data 207 contains market configuration data and the market data object 208 is a data structure that supports a market session during runtime.

The Bundled Service tier 204 contains a list of services, provided by third-party software components, upon which the market business tier depends. Key selection criteria include conformance to industrial standard (API), self-contain ability and performance. Components in this tier are listed as follows.

The Transaction manager 211 manages trade transaction boundaries and provides a mechanism to reinforce the ACID (atomicity, consistency, isolation and durability) rule in a transaction. The transaction manager 211 receives market orders as input and outputs transactions (when successful).

The Data persistence service 212 is responsible for persisting market data in a database-vendor neutral way. Its inputs are market events and trading data and is output persists to the embedded data storage.

The User management service 213 manages access control and other participant information in a market session receiving user credentials as input and outputting the traders attached to the user session.

The Network service 215 provides underlying network communication channels for the market kernel. It can choose from a list of standard network protocols such HTTP, TCP/IP, and RMI.

Embedded data store 214 allows a market session to be deployed securely and independently of external data storage.

As can be seen from the embodiment described, the market binary is self-contained with its own database and management so that no access to a third party or supplier server is required. This permits the system to be independent and provides greater security for individual market creators. In practice, only the traders authorized to participate in the market are aware of its existence and have the ability to participate. In addition, only authorized administrators have access to the data store, further promoting security.

Figure 3:
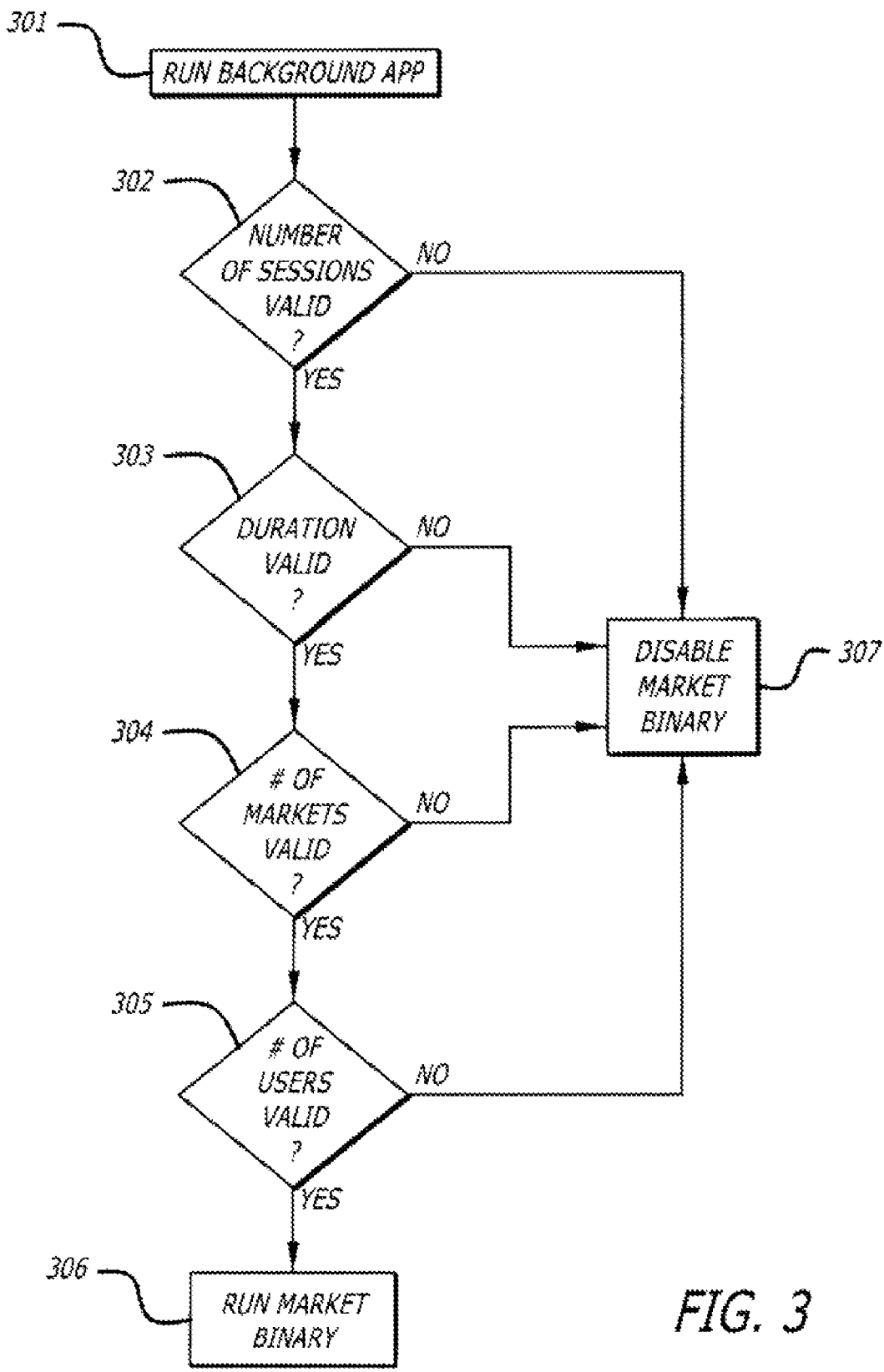
FIG. 3 is a flow diagram illustrating operation of a background application in an embodiment of the system.

In one embodiment, the market binary includes a background application that stores the parameters and limits selected by the user during the creation of the market. In the embodiment where pricing of the market binary is based on these factors, the background application acts as an enforcer of those limits. For example, if only ten traders were indicated in setting up the market, any attempt to provide for more than ten would not be permitted. Similarly, if the number of sessions or duration is exceeded, the market binary is disabled. The operation of this background application is illustrated in the flow diagram of FIG. 3.

At step 301 the background application is run. At step 302 it is determined if the number of sessions for the market binary is valid. That is, if the user has exceeded the number of sessions selected or not. If the number of sessions is valid, it is determined at step 303 if the duration is valid for this particular session. If true, the number of markets is checked at step 304. If the number of markets is valid, the number of traders is checked at step 305. If true the system runs the market binary at step 306. If any of the decision blocks return false, the background application disables the market binary at step 307.

Figure 6:
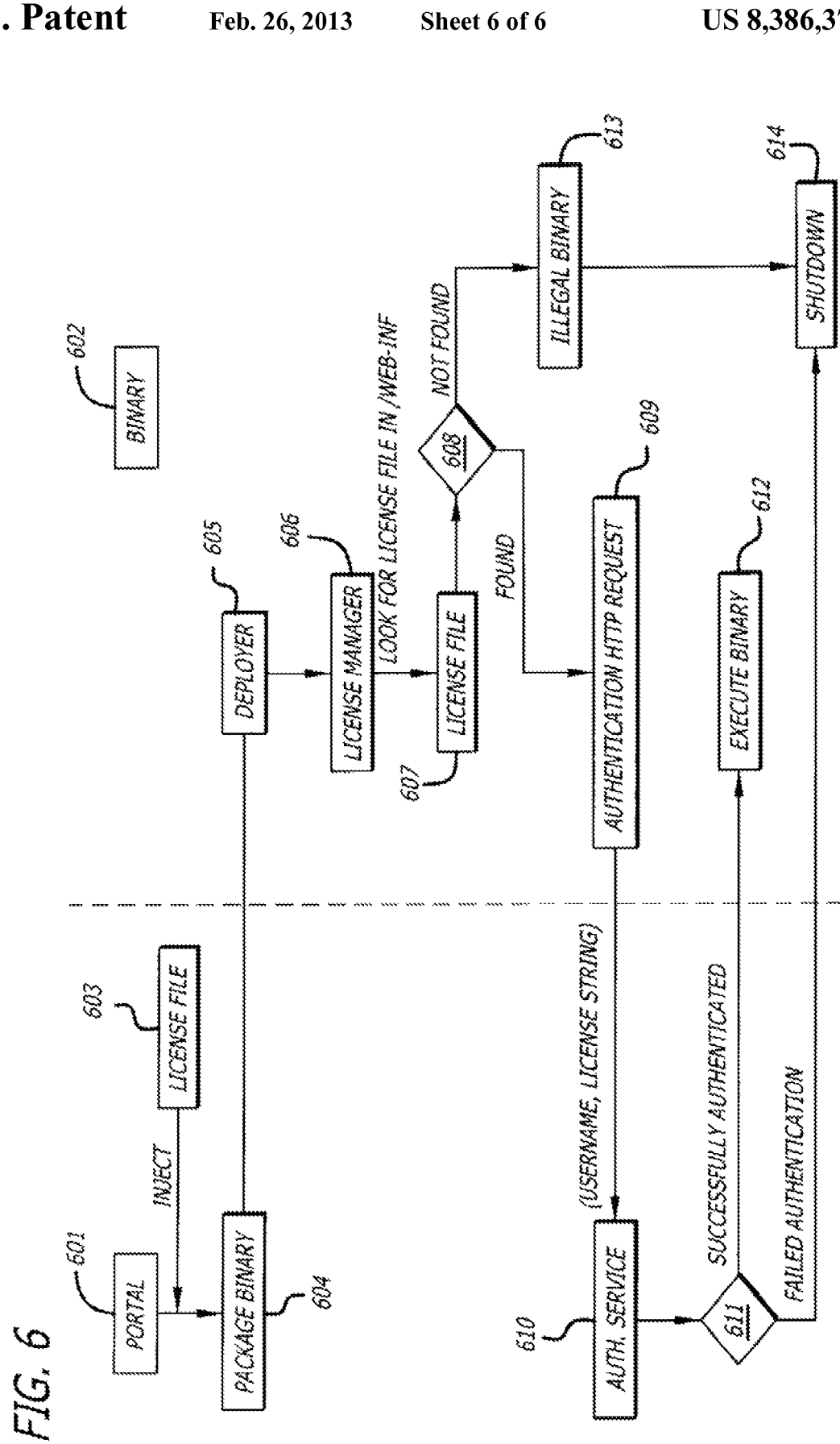
FIG. 6 illustrates a flow diagram for authenticating the market binary of the system.

FIG. 6 is a flow diagram illustrating an alternate embodiment of a binary management system. The portal side is 601 and the binary side is 602. At the portal side a license file (background file) 603 is injected into the custom built binary package 604. At the binary side when the binary is deployed 605 the license manager 606 is launched in the background and the license file is made available. At step 608 the system checks to see if the license file is found. If so, an authentication request 609 is made to the portal. An authorization service 610 is activated and at step 611 it is determined if the license is authorized. If so, the binary is executed at step 611. Otherwise the binary is shut down 614. If the license is not found at step 608, it is determined that the binary is illegal 613. The binary is then shut down 614.

Interface and Implementation

Figure 4:
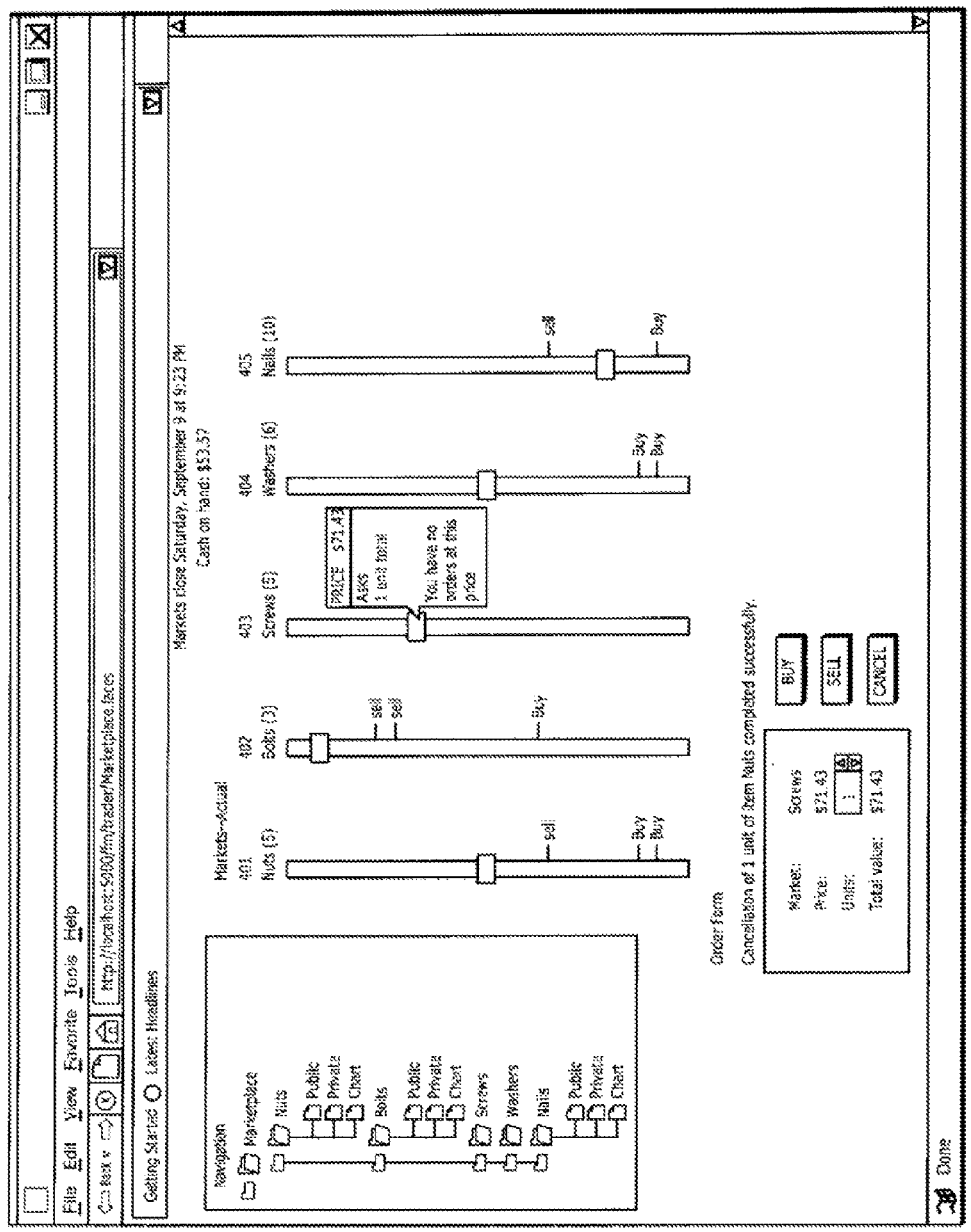
FIG. 4 illustrates an embodiment of the operation of a market binary of the system.

FIG. 4 illustrates an interface of one embodiment of the operation of a market binary of the system. In the example shown, there are five markets 401-405 in the market binary. The markets are for the sale and purchase of nuts 401, bolts 402, screws 403, washers 404, and nails 405. In the embodiment shown, each market is represented by a vertical slider bar with the terminals of the bar representing maximum and minimum prices. The price range may be set by the market administrator or agreed to by the participants. Whenever any trader indicates a desire to buy or sell, that intent is indicated by a line or tick mark on the slider of the market. For example, referring to nuts 401, there are two buy orders at the lower end of the slider and a sell order somewhat higher than the buy orders. In operation, the buy and sell orders can each have a unique color to easily indicate at a glance the type of transaction that is contemplated.

During a market session, the buy and sell requests fluctuate throughout the duration. For example there is only a single sell order for screws 403. By contrast, there are eight sell orders for nails and only a single buy order. As might also be expected, the buy orders are consistently lower than the sell orders.

The market binary 201 handles the display and updating of the browser window illustrated in FIG. 4. When a transaction is completed, the market binary also handles the updating of each trader's account. The system may be a continuous trading scheme or a batch trading scheme as desired by the market creator. The system can be enabled for limit or open order trading as well.

In one embodiment, when an offer is made to sell at a price below or equal to that of the best available buy order, a sale takes place. The seller is credited with the price of the buy order. Whenever an offer is made to buy at a price above or equal to that of the best available sell order, a purchase takes place. The seller is charged the price of the sell order.

In one embodiment the system imposes a price-time priority. That is, buy orders at high prices will be executed first. If there are several buy orders at the same price level, the oldest orders will be executed first. Analogously, sell orders at low prices will be executed first, and if there are several sell orders at a given price level, the oldest ones will be executed first.

In one embodiment, before an offer is valid, the system may check for a shortsale constraint and a bankruptcy constraint. The shortsale constraint concerns whether the buyer has enough cash or goods for the transaction. If a trader sends in an offer to buy, the trader needs to have enough cash or credit available. When making an offer to sell, the trader needs to have enough goods.

The bankruptcy constraint concerns a trader's ability to deliver on promises that are implicitly made by trading. The system may allow a trader to hold a portfolio that may generate a negative payoff at the end of a period. In one embodiment, however, it is not allowed you trade to holdings with unlimited losses. The limit is referred to as bankruptcy cutoff. If the bankruptcy cutoff is set equal to zero, only trades that guarantee positive payoffs at the end of the period are permitted.

Thus a method and apparatus for providing a market environment has been described.

What is claimed is:

1. A computer-implemented process for creating an exchange platform for facilitating the purchase and sale of goods or services or assets or a combination thereof among users over a computer network, comprising:
using one or more computing devices to perform the following process actions:
providing a computer network based infrastructure for access by a user;
allowing a user who has gained access to said infrastructure to enter market binary parameters, said parameters defining attributes of a market or markets being included in the exchange platform;
generating a market binary based on the user-entered market binary parameters, said market binary comprising a user downloadable form of said exchange platform which is downloaded by each user to a user computing device and which provides a two-sided electronic marketplace wherein users purchase and sell said goods or services or assets or a combination thereof, and wherein the market binary is self-contained and so each user computing device can independently run the electronic marketplace; and
wherein the process action of generating a market binary, comprises an action of generating a market kernel component of the market binary which implements each market according to the market binary parameters, receives orders to buy or sell or both, matches trades among the users and updates a state of the market.

2. The process of claim 1, wherein the process action of allowing a user to enter market binary parameters, comprises an action of allowing the user to enter a number representing the number of markets to be included in the market binary, as well as a type of good or service or asset that will be purchased and sold in each market.

3. The process of claim 1, wherein the process action of allowing a user to enter market binary parameters, comprises an action of allowing the user to enter, for each market, a number representing the number of users allowed to purchase or sell or both in the market.

4. The process of claim 1, wherein the process action of allowing a user to enter market binary parameters, comprises an action of allowing the user to enter, for each market, a number representing the number of trading sessions that can occur in a market, along with a period of time representing a duration of each session.

5. The process of claim 1, wherein the process action of allowing a user to enter market binary parameters, comprises an action of allowing the user to enter, for each market, information indicative of the identify of users that are to be allowed to purchase or sell or both in the market.

6. The process of claim 1, wherein the process action of allowing a user to enter market binary parameters, comprises an action of allowing the user to enter, for each market, whether a continuous trading scheme is to be employed or a batch trading scheme.

7. The process of claim 1, wherein the process action of generating a market binary, comprises an action of generating a communication component of the market binary which facilitates interaction between users over the computer network.

8. The process of claim 1, wherein the process action of generating a market binary, further comprises an action of generating a report service component of the market binary which creates a market report for each market comprising information on at least one of the market binary parameters and orders to buy or sell or both submitted during a market session.

9. The process of claim 1, wherein the process action of generating a market binary, further comprises an action of generating a trade validation service component of the market binary which validates incoming orders to buy or sell or both against limitations imposed by the market binary parameters.

10. The process of claim 1, wherein the process action of generating a market binary, further comprises an action of generating a clearing and settlement service component of the market binary which provides a data interface for a user in cases wherein external clearing and settlement agents are employed to guarantee the integrity of one or more of the markets.

11. The process of claim 1, wherein the process action of generating a market binary, further comprises an action of generating a market catalog data service component of the market binary which provides information on a configuration of one or more of the markets.

12. The process of claim 1, wherein the process action of generating a market binary, further comprises an action of generating a transaction manager component of the market binary which communicates with a transaction management service over the computer network and assists the market kernel component in managing transactions between users.

13. The process of claim 1, wherein the process action of generating a market binary, further comprises an action of generating a data persistence service component of the market binary which communicates with a data persistence service over the computer network and provides market events and trading data to the data persistence service for conversion into database-vendor neutral data which is then stored in an embedded data storage component of the market binary.

14. The process of claim 1, wherein the process action of generating a market binary, further comprises an action of generating a user management service component of the market binary which communicates with a user management service over the computer network and employs the user management service to validate user credentials.

15. The process of claim 1, wherein the process action of generating a market binary, further comprises an action of generating a background component of the market binary which enforces limitations imposed by the market binary parameters by disabling the operation of the market binary for a user if one of said limitations is exceeded.

\* \* \* \* \*